United States Patent

[11] 3,584,835

| [72] | Inventors | Erving F. White;<br>Gordon W. Goodwin; Arnold E. Roberts,<br>all of Jackson, Mich. |
|---|---|---|
| [21] | Appl. No. | 837,583 |
| [22] | Filed | June 30, 1969 |
| [45] | Patented | June 15, 1971 |
| [73] | Assignee | Aeroquip Corporation<br>Jackson, Mich. |

[54] TENSIONING DEVICE
20 Claims, 9 Drawing Figs.

[52] U.S. Cl. .................................................. 254/67
[51] Int. Cl. ..................................................... B66f 3/08
[50] Field of Search ........................................... 254/67, 78;
248/361; 24/24 PS

[56] References Cited
UNITED STATES PATENTS
| 2,784,938 | 3/1957 | Huber | 254/67 |
| 3,142,877 | 8/1964 | Lesley | 254/78X |

Primary Examiner—Robert C. Riordon
Assistant Examiner—David R. Melton
Attorney—Jerry K. Harness ABSTRACT: A device for creating and maintaining tension in a chain or cable used for securing cargo. The device has telescoping parts, and indicia on the inner element are successively exposed as the device is tensioned to indicate the degree of tension. A nut is rotated to build up the tension and springs permit some stretch if the cargo shifts. A quick release mechanism has latch parts which are enclosed and protected, and a handle which can be pulled directly away from the device for tension release. The release handle operates through a lanyard on a reel so that the hand of the operator will be a safe distance away from the device when tension is released. To relatch the device for another tensioning operation, it is merely necessary to return the chain or cable retaining member to its latched position.

In one form of the tensioning device, frustoconical springs are used in series with a lighter coil spring which is deflected when the tensioning nut is originally taken up. In another form, used for lighter loads, the frustoconical springs along are used.

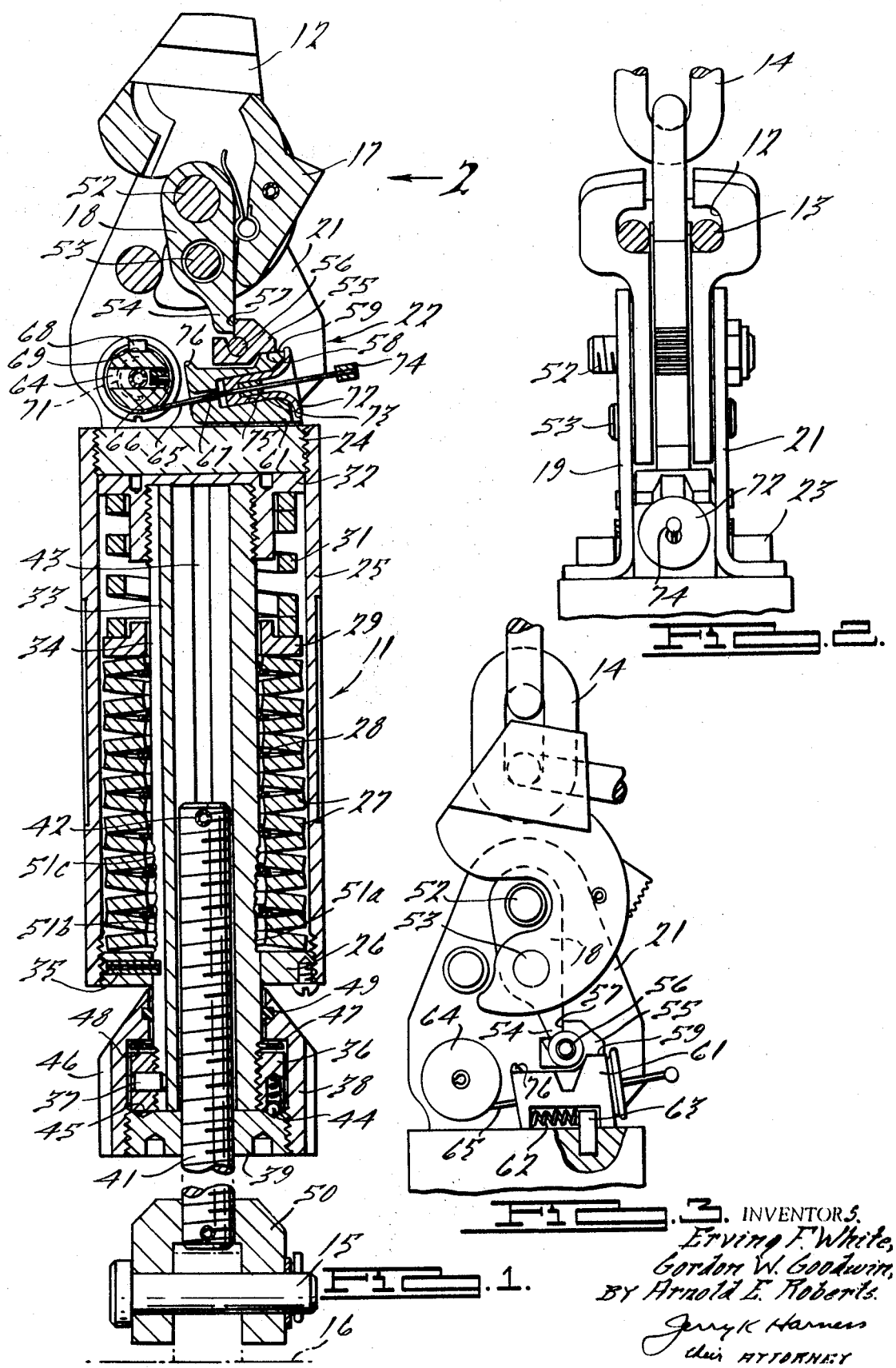

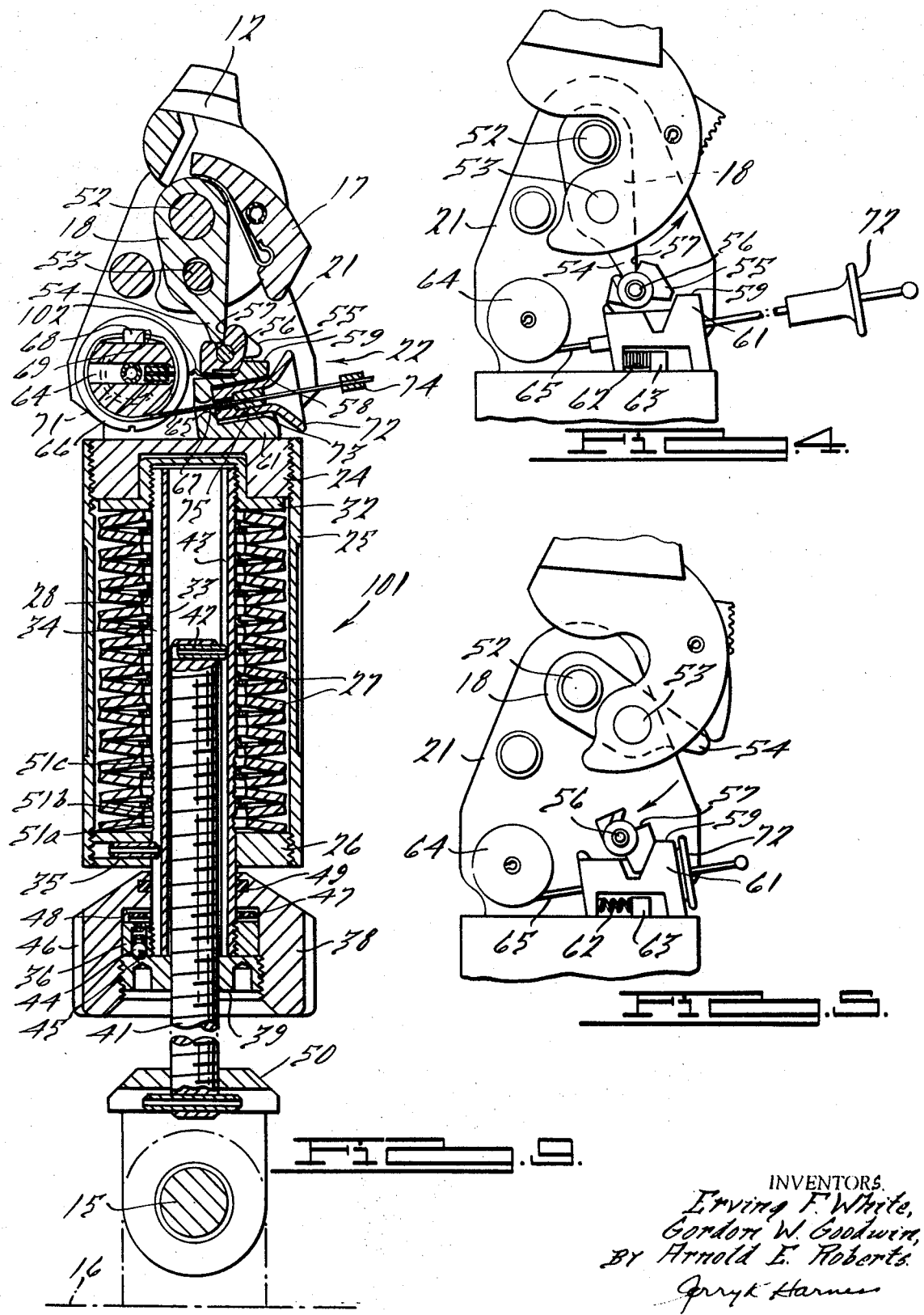

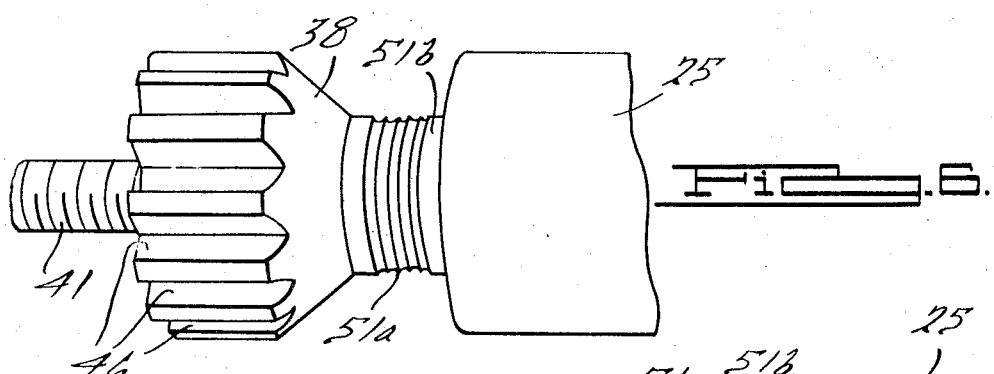
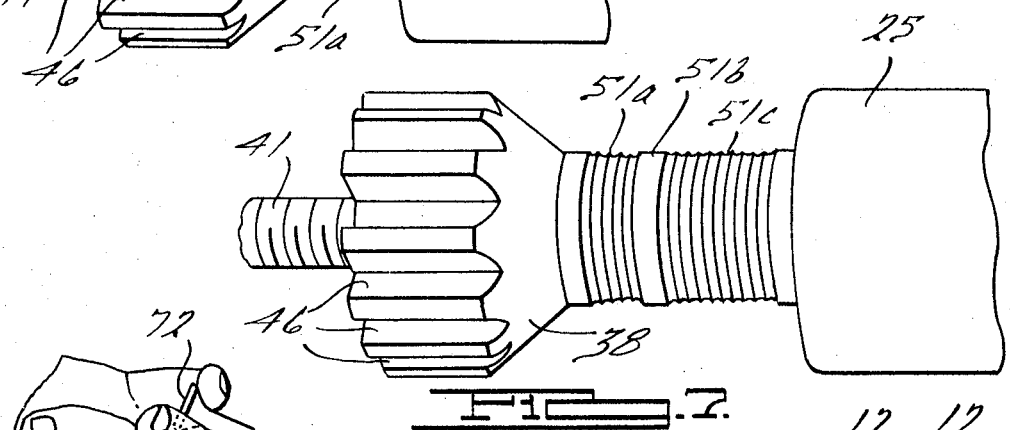
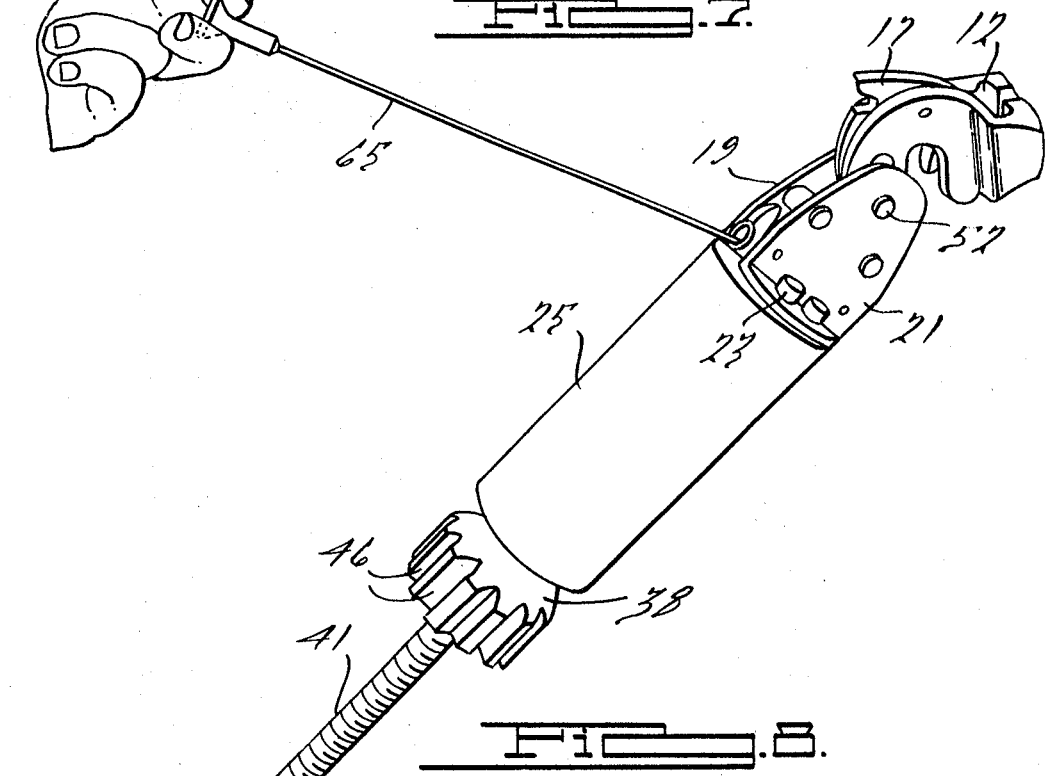

TENSIONING DEVICE

BACKGROUND OF THE INVENTION

The invention relates to tensioning devices of the type used to tie down cargo with chains, straps or cables, with one end of the device being fixed and the other attachable to the chain. The device is then used to tension the chain but is quickly releasable when desired.

DESCRIPTION OF THE PRIOR ART

A tensioning device of this general type is shown in U.S. Pat. No. 3,142,877 issued Aug. 4, 1964 to H. T. Lesley and entitled "Tensioning Device." This prior type of device has several disadvantages which is an object of the present invention to overcome. Among these is the fact that quick release handle is alongside the housing of the device, thus making it dangerous to operate since sudden release of the chain or cable often has a snapping effect which could injure the operator. Prior art tensioning devices of this type have not had yieldable means for maintaining tension in the chain upon shifting of the cargo. They also lacked means for indicating clearly the degree of tension so that a person releasing the chain or line will take proper precautions to prevent injury.

BRIEF SUMMARY OF THE INVENTION

According to the invention, the tensioning device is provided with yieldable means in the form of frustoconical or Belleville springs which will maintain tension in a chain despite cargo shifting. The springs are enclosed in a housing and engage the underside of a piston which is drawn away from the housing cap when the device is tensioned. Upon release, the air trapped by this piston will dampen the shock of spring expansion. A piston rod extends through the Belleville springs and carries a rotatable tensioning nut threaded on a shaft, the outer end of which may be pivotally secured to a deck or other fixed part. The piston rod is provided with a series of colored stripes which are successively exposed as tension is increased, to indicate the degree of tension.

A frame extends from the housing cap and has two sidewalls which enclose and protect the release mechanism for a chain jaw at the outer end of the frame. The jaw is carried by a pivoted lever as in U.S. Pat. No. 3,142,877, but the quick release mechanism comprises a pivoted latch pawl for the lever which is held in latching position by a spring-urged slidable latch block. A lanyard on a rewind reel extends through this latch block and carries a pull knob normally nested within the latch block. When the device has been tensioned by rotating the tensioning nut, and it is desired to quickly release the tension, the knob is pulled directly away from the frame. The latch block will not be shifted however until the lanyard is practically fully extended at which time an actuating collar fixed to the lanyard engages the latch block to shift it to its release position. A spring or nose carried by the latch block insures that the latch pawl is in proper position for relatching the chain jaw. Upon release of the knob the lanyard is rewound on the reel and the latch block returned preparatory to relatching the jaw. Relatching is accomplished merely by swinging back the chain jaw and lever.

In one form of the invention, the Belleville springs are supplemented by a weaker coil compression spring. This device is especially useful for heavier loads which require stronger Belleville springs, since these springs will ordinarily not be compressed by the tension created by rotating the tension nut. The coil spring thus acts as a pretension spring, creating tension in the system when the nut is rotated.

BRIEF DESCRIPTION OF THE DRAWINGS

FIG. 1 is a cross-sectional view in elevation of a tensioning device constructed according to the invention, the chain jaw being shown in its latched position;

FIG. 2 is a partial end elevational view taken in the direction of the arrow 2 and showing the engagement of a chain in the chain jaw;

FIG. 3 is a partially schematic view showing the parts in latching position;

FIG. 4 is a view similar to FIG. 3 but showing the lanyard extended and the latch block shifted to its releasing position;

FIG. 5 is a view similar to FIGS. 3 and 4 but showing the chain jaw in its released position;

FIG. 6 is a fragmentary perspective view showing the tensioning device in its pretensioned position so that the green indicators are exposed;

FIG. 7 is a view similar to FIG. 6 but showing the device fully tensioned with the red indicators exposed;

FIG. 8 is a perspective view showing the manner in which an operator's hand is protected by being a substantial distance from the tensioning device when it is released; and FIG. 9 is a view similar to FIG. 1 of a modified form of the invention in which only Belleville springs are used, and in which the nose on the latch block for insuring proper positioning of the latch pawl is replaced by a spring.

DESCRIPTION OF THE PREFERRED EMBODIMENTS

Referring first to the embodiment of FIGS. 1 to 5, the tensioning device is generally indicated at 11 and comprises a chain jaw 12 at one end for retaining link 13 of a chain 14, and a pin 15 at the other end for securing to a deck 16 or other stationary part. The link 13 which is retained by jaw 12 may be any appropriate link which will result in a chain of proper length. It should be understood that the principles of this invention are applicable to other flexible fastening means such as cables or straps. A chain link retaining member 17, as described in the above U.S. Pat. No. 3,142,877, is pivoted to chain jaw 12 and the latter is pivotally connected to a lever 18 mounted between the sides 19 and 21 of a frame generally indicated at 22. The chain jaw is movable between a chain-holding position shown in FIG. 1 and a releasing position shown in FIG. 5.

The sides 19 and 21 of frame 22 are secured by bolts 23 to the cap 24 of a cylindrical housing 25, the housing being provided with a bottom cap 26. A plurality of stacked frustoconical or Belleville springs 27 are disposed within housing 25, the springs being alternately engageable at their inner and outer edges. Spacers 28 are provided for preventing the Belleville springs from flattening completely, these spacers comprising rings of L-shaped cross section. The radial portion of each spacer is disposed between the inner portions of adjacent Belleville springs whereas the axial portion is immediately within the inner diameter of a Belleville spring. Thus the springs may collapse until their inner edges engage opposite sides of the radial portions of spacers 28.

The lower end of a stack of Belleville springs 27 rests on bottom cap 26 of housing 25, and an annular adapter ring 29 rests against the other end of the stack. A helical coil compression spring 31 engages the other side of adapter 29 and is disposed between this adapter and the underside of a piston 32. A piston rod 33 is secured to piston 32 and extends downwardly through spring 31, adapter 29, springs 27, spacers 28 and bottom cap 26. A longitudinal keyway 34 in piston rod 33 receives a key 35 extending inwardly from bottom cap 26. The strength of spring 31 is considerably less than that of springs 27 so that when cap 26 and piston 32 are drawn toward each other spring 31 will collapse before springs 27 are appreciably deflected.

A collar 36 is secured to the lower end of piston rod 33, being held from rotating by a pin 37. A tensioning nut 38 surrounds collar 36 and has an insert 39 threaded on a shaft 41 which extends inside the hollow piston rod. A pin 42 carried by a shaft 41 is disposed in a longitudinal keyway 43 in the piston rod to prevent relative rotation therebetween. A spring-pressed detent 44 is carried by collar 36 and is adapted to enter any one of a plurality of circumferentially spaced recesses in nut insert 39, thus defining uniform stops for the rotation of nut 38. The outer surface of nut 38 is serrated as indicated at 46 to facilitate manual rotation. The nut surrounds collar 36, and an antifriction bearing washer 47 is disposed between collar 36 and a shoulder 48 on the nut, on the side of the collar opposite nut insert 39. A dust seal 49 is carried by the tensioning nut and engages piston rod 33.

The outer end of shaft 41 carries a clevis 50 which holds pin 15. The arrangement is therefore such that, with nut 38 originally rotated so that shaft 41 is fully extended, a chain 14 may be connected to chain jaw 12 and nut 38 thereafter rotated on shaft 41 until spring 31 is compressed to provide a pretension load in the chain. During this rotation shoulder 48 of the tensioning nut will rest against collar 36 through bearing 47 to apply an axial force on piston 32 which will compress spring 31, and piston rod 33 will be drawn downwardly over shaft 41.

A series of colored bands 51 are marked on piston rod 33 in the portion thereof which becomes exposed as the piston rod is drawn outwardly from cap 26, as shown in FIGS. 6 and 7. These indicia are to show the amount of tension in the unit. For example, the first section 51a of indicia to be exposed could be colored green; the next section 51b yellow and the last section 51c red. When the device has no load, only the clear portion of the piston rod below the indicia would be exposed. When the pretension load is applied, that is, when spring 31 is collapsed, the green area of indicia 51a would be exposed. As a tension load is applied to compress springs 27, first the yellow area 51b and then the red area 51c would be exposed. Thus, a person about to operate the quick release mechanism would be forewarned as to the amount of tension in the chain so that he could take proper precautions to avoid injury.

Lever 18 is mounted on a pivot 52 extending between frame sides 19 and 21 and carries a pin 53 on which jaw 12 is pivotally mounted. A finger 54 on lever 18 is engageable by a latch pawl 55 mounted on a pivot pin 56. This latch pawl has a shoulder 57 on one side for latching finger 54 and a diagonally opposite projection 58 for engaging the raised portion 59 of a latch block 61. The latch block is slidably mounted on cap 24 and is urged toward a latching position with respect to pawl 55 by a spring 62 underneath the slide which rests against an abutment 63 (See FIGS. 3 to 5).

A lanyard rewind reel 64 is rotatably mounted adjacent block 61 and carries a lanyard 65. One end 66 of this lanyard is fixed to the reel, and the lanyard extends counterclockwise from this end around the reel as shown in the figures, the leading end extending through a passage 67 in latch block 61. Lanyard 65 carries an enlarged portion 68 in the form of a collar secured thereto, this collar being so positioned that when the lanyard is pulled through block 61 it will not engage the block until the lanyard is almost entirely pulled out. Collar 68 rests in a recessed portion 69 of reel 64. A spring 71 shown partially at 71 urges reel 64 in a rewinding or clockwise direction.

A handle 72 is provided on the outer end of lanyard 65, this handle being in the form of a flared cylindrical member. The lanyard has a member 73 fixed thereon to retain handle 72, and the lanyard extends slightly outwardly from the handle with another collar 74 fixed thereto. Handle 72 is in a complementary recess 75 in block 61.

A nose 76 is formed on block 61 for the purpose of insuring that pawl 55 will be properly rotated to its FIG. 5 position when the chain is released so that the chain jaw may be properly relatched.

It should be noted that all the parts of the quick release mechanism are disposed within the confines of frame walls 19 and 21 and therefore it will be fully protected from damage.

FIG. 9 shows a modified form of the invention generally indicated at 101, which is constructed similarly to the previous embodiment but does not include the pretensioning spring. This device will be used for relatively light loads in which the Belleville springs will be somewhat compressed by pretensioning of the device through nut rotation. Another difference between the two constructions is that a leaf spring 102 with a projection at one end is mounted on the latch block and in place of the nose of the previous embodiment and serves the same function of insuring that the latch pawl is properly positioned to permit relatching of the chain jaw.

To summarize the operation, and referring to the first embodiment, tensioning nut 38 will be initially rotated so as to fully extend shaft 41 and link 13 of chain 14 will be inserted in jaw 12 which will be in latched position. The nut will then be rotated until the slack is taken up and further rotated until a pretension load is placed in the device, compressing the pretension spring 31. This will cause green indicators 51a to be exposed, as shown in FIG. 6.

Should the cargo shift during transit and additional tension placed in the chain, Belleville springs 27 will compress and will expose yellow indicator 51b or the red indicators 51c, depending upon the amount of additional tension. The operator who wishes to release the chain will therefore be forewarned as to the amount of possible snapping action.

To release the chain, handle 72 will be grasped and pulled, extending lanyard 65 until collar 68 engages latch block 61. This will slide the latch block to the right at which time the operator's hand will be a substantial distance from the device, as shown in FIG. 8. Retraction of the latch block will release latch pawl 55 (swinging it to the FIG. 5 position in readiness for relatching) which in turn will release lever 18 on which chain retaining jaw 12 is pivoted. The latter will swing outwardly, releasing chain 14, and springs 27 and 31 will expand, returning piston 32 to its home position. During this return movement the air trapped by the piston will dampen its return. During compression and expansion of the Belleville springs, spacers 28 will maintain them in proper relationship with each other and with piston rod 33. Release of handle 72 will permit spring 71 to retract lanyard 65 onto reel 64, and permit spring 62 to return latch block 61 to its latching position. Jaw 12 may be relatched merely by swinging back lever 18 which in turn will pivot the latch pawl 55 from the position of FIG. 5, the pawl momentarily camming latch block 61 out of the way. The latch block will return under the influence of spring 62 and will hold pawl 55 in position. It will therefore be necessary to perform only one manual movement to return the parts into position for reconnection with the chain.

We claim:

1. In a tensioning device for use with flexible fastening means such as a chain, a telescoping structure movably secured at one end to a fixed part and having a retaining jaw at the other end releasably attaching it to the flexible fastening means, manually operable threaded means for shortening said telescoping structure to tension said flexible fastening means, a frame at said other end of the device, said retaining jaw being mounted on said frame for movement between a latched position and a quick release position, means latching said retaining jaw in its latched position, said last-mentioned means including a latch block movably mounted within said frame between latching and releasing positions, yieldable means urging said latch block toward its latching position, a quick release actuator normally stored within said frame but manually withdrawable from its stored position in a direction away from the tensioning device, and means on said quick release actuator responsive to grasping and manually withdrawing the leading end thereof a substantial distance away from said tensioning device to shift said latch block to its releasing position, whereby tension in said flexible fastening means may move the retaining jaw to its quick release position.

2. The combination according to claim 1, said quick release actuator comprising a lanyard, a reel for said lanyard within said frame, the lanyard extending through said latch block whereby it may be pulled in a direction away from said tensioning device, said means for shifting the latch block comprising a collar on said lanyard engageable therewith, and a spring urging said reel toward a lanyard rewind position.

3. The combination according to claim 2, further provided with a handle mounted on the leading end of said lanyard, and a recess in said latch block receiving a portion of said handle when the cable is in its stored position.

4. The combination according to claim 1, further provided with means responsive solely to manual return of said retaining jaw to its latched position for causing the retaining jaw to be latched.

5. The combination according to claim 4, said last-mentioned means comprising a lever pivoted within said frame, said retaining jaw being pivoted to said lever, a latch pawl pivoted within said frame and engageable with the outer end of said lever to hold it in latched position, said latch block being slidably mounted, and coacting surfaces on said latch pawl and latch block whereby the latch pawl will be held in latched position by the latch block.

6. The combination according to claim 5, further provided with a projection carried by said latch block and engageable with the latch pawl when the latch block moves to its releasing position so as to rotate the latch pawl into a position where it may receive said lever when the latter is returned to a latching position, the latch pawl having a surface engageable with the latch block when the latch pawl is rotated to its latching position to cam the latch block momentarily away from its latching position.

7. The combination according to claim 1, said tensioning device further comprising a cylindrical housing to which said frame is secured, a piston slidable in said housing, spring means disposed between said piston and the end of said housing remote from the said frame and urging the piston toward the frame, a piston rod extending through said spring means and from said housing, a key and keyway connecting the housing and piston rod, said threaded means comprising a threaded shaft in said piston rod and connected thereto by a key and keyway, a manually rotatable tensioning nut threaded on said shaft outwardly of said piston rod, a thrust connection between the piston rod and tensioning nut, and a pivotal connection between said shaft and said fixed part.

8. The combination according to claim 7, said spring means comprising a stack of frustoconical washers alternately engageable at their inner and outer edges.

9. The combination according to claim 8, further provided with annular spacers between those frustoconical springs which are engageable at their outer edges, said spacers having radial portions disposed between the inner portions of the springs and axially extending portions disposed between the inner surfaces of the springs and said piston rod.

10. The combination according to claim 8, said spring means further comprising a helical coil compression spring in series with said frustoconical springs, an annular adapter disposed between the helical spring and the frustoconical springs, the helical spring being substantially weaker than the frustoconical springs whereby the helical spring will be compressed first when the tensioning nut is rotated to compress the springs.

11. The combination according to claim 7, said piston fitting in said housing in such manner that when said retaining jaw is released expansion of the springs will be dampened by the entrapment of air between the piston and the adjacent end of the housing.

12. The combination according to claim 7, said piston rod having a series of indicia successively exposed by withdrawal from the housing whereby an operator may ascertain the degree of tension in the tensioning device.

13. The combination according to claim 12, said indicia comprising a series of stripes of different colors on said piston rod.

14. In a tensioning device for use with flexible fastening means such as a chain, a cylindrical housing having a frame extending from one end thereof, a piston slidable in said housing, spring means disposed between said piston and the end of the housing remote from said frame and urging the piston toward the frame, a piston rod extending through said spring means and from said housing, a key and keyway connecting the housing and piston rod, a threaded shaft in said piston rod and connected thereto by a key and keyway, a manually rotatable tensioning nut threaded on said shaft outwardly of said piston rod, a thrust connection between the piston rod and tensioning nut, a pivotal connection at the outer end of said shaft for connection to a fixed part, a retaining jaw mounted on said frame for releasably attaching it to the flexible fastening means and movable between a latched position and a quick release position, means latching said retaining jaw in its latched position, and means for quickly releasing said latching means whereby tension in the flexible fastening means may move the retaining jaw to its quick release position.

15. The combination according to claim 14, said spring means comprising a stack of frustoconical washers alternately engageable at their inner and outer edges.

16. The combination according to claim 15, further provided with annular spacers between those frustoconical springs which are engageable at their outer edges, said spacers having radial portions disposed between the inner portions of the springs and axially extending portions disposed between the inner surfaces of the springs and said piston rod.

17. The combination according to claim 15, said spring means further comprising a helical coil compression spring in series with said frustoconical springs, and an annular adapter disposed between the helical spring and the frustoconical springs, the helical spring being substantially weaker than the frustoconical springs whereby the helical spring will be compressed first when the tensioning nut is rotated to compress the springs.

18. The combination according to claim 14, said piston fitting in said housing in such manner that when said retaining jaw is released expansion of the springs will be dampened by the entrapment of air between the piston and the adjacent end of the housing.

19. The combination according to claim 14, said piston rod having a series of indicia successively exposed by withdrawal from the housing whereby an operator ma ascertain the degree of tension in the tensioning device.

20. The combination according to claim 19, said indicia comprising a series of stripes of different colors on said piston rod.